Patented Sept. 17, 1940

2,215,353

UNITED STATES PATENT OFFICE 2,215,353

PROCESS OF MAKING FIBERBOARD

Joseph W. Gill, Elmhurst, Ill., assignor to United States Gypsum Company, Chicago, Ill., a corporation of Illinois No Drawing. Application March 29, 1937, Serial No. 133,649

4 Claims. (Cl. 92—7)

This invention relates to a fibrous product made from straw or like materials, and further relates to those steps in the processing of straw relating to its cooking and subsequent mechanical fibration, for the manufacture of such products as insulation board, fiber building board, etc.

One common method of processing straw is to cook it with a small percentage of lime, following this with treatment in a beater, attrition mill such as a "Bauer," or other such equipment, then forming it on the machine in the conventional manner. While by this process fair yields are obtained, the resulting product has a disagreeable yellow color which many find objectionable.

There are a number of other chemical cooking processes, such as those using a small percentage of soda ash or sodium carbonate in combination with sodium sulphite. These result in a relatively low yield and a "slow stock," which, while satisfactory for straw paper, is not satisfactory for the type of insulative board for which I use the stock prepared by my process.

A still further way of preparing straw pulp is to cook it for periods of 4 to 8 hours, and sometimes even longer, in an atmosphere of steam at a pressure of 45 lbs. or thereabouts. This process produces a dark brownish colored product having low light reflection and a disagreeable color. Yields are relatively low, being on the order of 55% based on straw as received. A considerable quantity of steam is used, besides needing a considerable outlay of capital for digestors used in these long cooks.

It is, therefore, an object of my invention to provide a process of producing fibrous materials from agricultural straw-like wastes such as cereal straws, flax straw, and the like.

Another object of my invention is to provide a process of producing an insulating material from agricultural straw-like wastes in an economical manner, this insulating material to possess adequate strength, a pleasing light colored appearance, etc.

Another object of my invention is to provide a process of producing a fibrous product from straw suitable for use in wallboard products, without the use of chemicals or high steam pressure.

A further object of my invention is to provide a process whereby a better yield is obtained of the fibrous constituents of the straw.

A still further object of my invention is to reduce the cooking costs by using less steam, and to increase the capacity of existing equipment by cutting down the processing time; also to improve molded straw products and their process of manufacture in other respects hereinafter specified and claimed.

In adapting my invention and illustrating its use in the manufacture of an insulative sheet, such as wallboard, it is not my intention to limit it to the same, for it is only for the purpose of exemplification. The fibrous materials as produced by my process can be used in the manufacture of other products, for instance fillers in plastics, a coarse grade of paper or cardboard, or as a constituent in roofing felt.

In brief, the improved process consists of an improved system of cooking the straw using lower temperatures and shorter cooking time than is usual, and then compensating for this lighter cooking by double processing through a machine, such as the "Bauer" pulper. In using my process I am able to permeate with water the individual straw fiber and overcome the natural brittleness inherently associated with cereal straws. Thus I obtain straw fibers that are thoroughly permeated with moisture but not wilted and containing all the natural encrusting agents.

The straw which is received in bales from the farmers, is shredded by conventional means to a convenient size, such as 1" in length. The shredded straw is then digested in a large globe digestor or other digestor of conventional design, in the presence of more or less water. There may be no additional water used at all, depending solely upon condensation of steam and the amount of moisture in the straw which may average about 15%, or as much as four times as much water by weight as straw, or even more may be used. In my process I then digest with steam at about 15 lbs. per square inch gauge pressure. It is within the scope of my invention to use steam down almost to atmospheric pressure or to use somewhat higher pressures, though one of the objects of my invention is to use lower steam pressures and less steam than in conventional processes of digestion. It is to be understood that with lower steam pressures it will be necessary to increase the digestion time somewhat, whereas with higher steam pressures the digestion time may be cut down slightly. The choice of the exact steam pressure, therefore, depends somewhat upon circumstances.

With 15 lbs. of steam pressure, I find that approximately 2 hours of digestion time is satisfactory for complete permeation of the straw with water to the desired point. It should be understood that with this degree of digestion the straw fibers are not completely disintegrated or softened. The general form of the straw itself is maintained, and the color while considerably darker than the original straw is not nearly as dark as when the digestion is carried to 4 to 8 hours with, say, 45 lbs. of steam. We may call these straw fibers moisture permeated.

These moisture permeated fibers are then for convenience stored for further processing. They may be used at once or they may, for example, be stored as long as 24 hours and possibly even longer. During this storage period, I prefer to so control the water in the preceding process that no excess digestion liquor drains off, but the straw is left in a hot and damp condition.

The hot and moisture permeated straw is then conveyed to, and processed through a refining machine of one type or another. I have found the machine known as the "Bauer" pulper very satisfactory for this purpose. As the straw is fed to the Bauer pulper, a certain amount of water is added to it, as well as steam so as to keep the temperature up. I find, for example, that as the straw emerges from the Bauer pulper it may have a consistency of 5% to 10%; i. e., there may be 5% to 10% of stock and 90–95% of water. Following this first Bauering operation, I feed the straw to a second Bauer. If there is more than 95% water present after the first Bauer, I may find it convenient to drain or press some of this water out. On passing the straw through the second Bauer, more steam and water is added so that when it emerges from the second Bauer its consistency may be on the order of 4 or 5% pulp.

From the second Bauer I may convey the straw which at this point is known as "pulp," to a beater with a washing device, or to some washing cylinder of conventional make and subject it to a comparatively light washing operation to remove dirt and fines so as to lighten the color of the board. I may also size it at this point with the well know rosin sizes and alum; or it is within the scope of my invention to use other sizes, for instance wax sizes. From the beater the pulp is conveyed to a Jordan and it is further diluted at this point. This Jordan brushes out the fibers and separates one from another so that large bundles of fibers no longer occur. I may at this point add paper fiber pulp or to impart the desired characteristics and strength, the amount varying from 8% to 16% with different boards and averaging about 12%.

It is also within the scope of my invention to convey the stock directly from the Bauer machine to the Jordan without the intermediate beater stage, and in this case I can do my sizing and alum addition in the conveyors or possibly the storage chests preceding the Jordan.

Following the Jordaning, the pulp is pumped to the forming machine. The forming machine may be of the Fourdrinier type or one of its modifications, or may be a single or multiple cylinder type. The pulp is diluted in a head box as it enters the forming machine so that when formed it may be on the order of ½ to ¾ of 1% consistency. Following the forming, the excess water is pressed out within a press roll section, and then the board dried in a conventional dryer of some type.

The particular novelty of my invention is the fact that whereas in older processes it has been necessary to digest the straw for a relatively long time; i. e., 4 to 8 hours at a relatively high steam pressure on the order of 45 lbs. and then give it only a light refining such as that obtained in a beater followed by the Jordan, or possibly a single Bauer followed by a Jordan or beater and Jordan, in my process I digest it to a lesser degree, then follow this lighter digestion with a more thorough and severe refining.

I find that by my process I have several unexpected advantages, the chief of which is that by this lesser amount of digestion and more severe refining I obtain a considerably greater yield of pulp from my straw than by the other methods. For example, the yields which I obtain are on the order of 65 to 70%, whereas the yields obtained by the more severe digestion method may be on the order of only 50%.

By my process I find that the resulting pulp and board is lighter in color and therefore results in a product of more pleasing appearance and greater light reflection. The light reflection of the old process board and with my improved board, was measured with a standard Zeiss Pulfrich photometer with $K_1$ (red), $K_4$ (green) and $K_6$ (blue) filters, with the following results:

| Type of board | | Percentage light reflection | | | |
|---|---|---|---|---|---|
| | | $K_1$ | $K_4$ | $K_6$ | Average |
| Old process | Front | 22.9 | 15.0 | 10.2 | 16.0 |
| | Back | 24.5 | 15.1 | 10.6 | 16.7 |
| New process | Front | 41.8 | 31.5 | 23.7 | 32.3 |
| | Back | 40.8 | 29.6 | 21.8 | 30.7 |

It will thus be seen that the improved board has approximately double the light reflection as the old process board, which greatly enhances its salability.

Furthermore, the shorter digestion time results in a greater capacity for my equipment. I can digest approximately three times as much straw by my process as was possible when the 8-hour digestion period was used. Less steam is used which is a resulting further economy in processing cost.

I do not wish to limit my invention to the precise examples as given above, as obviously, there are many variations which will still embody the principles disclosed and which I claim, but which may differ in detail from examples as given, and will still be within the spirit of this invention as defined in the appended claims.

Having thus described my invention, I claim as new and desire to secure by Letters Patent:

1. The process of making a molded straw board, comprising shredding the straw to about an average of one inch in length, then digesting said shredded straw without chemicals under about 15 lbs. per sq. in. steam pressure for about two hours without completely softening said straw, then double refining the digested straw in attrition type mills at consistencies of 10% and 4–5% respectively, then forming the refined straw into board, and drying said board.

2. The process of making a molded straw board, comprising shredding the straw to about an average of one inch in length, then digesting said shredded straw without chemicals under about 15 lbs. per sq. in. steam pressure for about two hours, then double refining the digested straw in attrition type mills at consistencies of 10% and 4–5% respectively, adding paper pulp to said refined straw, forming the resulting mixture into board, and drying the board.

3. The process of making a molded straw board which comprises shredding the straw, then digesting said straw without chemicals under about 15 lbs. per sq. in. steam pressure for approximately 2 hours, then refining the resulting material in a "Bauer" type of mill while hot and at a consistency of about 10%, then refining the resulting material while hot in a second "Bauer" type mill at a consistency of 4-5%, then mixing paper pulp with the refined pulp, and then forming the resulting mixture into board.

4. The process of making an insulation board from cereal straw, which comprises shredding the straw to an average of about one inch in length, then digesting said shredded straw under about 15 lbs. per sq. in. steam pressure for about two hours so as to leave substantially all incrustants in said straw without appreciably darkening said straw and so as to permeate said straw with moisture without completely softening said straw and without the use of chemicals, then refining the resulting straw in a "Bauer" type of attrition mill while hot and at a consistency of about 10%, then refining the resulting material while hot in a "Bauer" type of attrition mill at a consistency of 4-5% and with a yield of 70-75% based on the dry weight of the original straw, adding size and alum to said product, then subjecting said product to beating and Jordan actions, then forming the resulting mixture into board form, and then drying said boards, said boards being light in color and characterized by an average light reflection of 30.7 to 32.3 units as measured by a Zeiss Pulfrich photometer.

JOSEPH W. GILL.